US010010988B2

(12) United States Patent
Yoshimoto

(10) Patent No.: US 10,010,988 B2
(45) Date of Patent: Jul. 3, 2018

(54) WORKPIECE TRANSFER APPARATUS WITH SHIFTER AND CROSSBAR AND WORKPIECE TRANSFER METHOD USING SAME

(71) Applicant: HITACHI ZOSEN FUKUI CORPORATION, Awara-shi, Fukui (JP)

(72) Inventor: Takaaki Yoshimoto, Awara (JP)

(73) Assignee: HITACHI ZOSEN FUKUI CORPORATION, Awara-shi, Fukui (JP)

( * ) Notice: Subject to any disclaimer, the term of this patent is extended or adjusted under 35 U.S.C. 154(b) by 52 days.

(21) Appl. No.: 14/784,458

(22) PCT Filed: Mar. 17, 2014

(86) PCT No.: PCT/JP2014/001515
§ 371 (c)(1),
(2) Date: Oct. 14, 2015

(87) PCT Pub. No.: WO2014/171064
PCT Pub. Date: Oct. 23, 2014

(65) Prior Publication Data
US 2016/0067842 A1    Mar. 10, 2016

(30) Foreign Application Priority Data
Apr. 17, 2013   (JP) .................................. 2013-086964

(51) Int. Cl.
*B21D 43/18* (2006.01)
*B23Q 7/04* (2006.01)
(Continued)

(52) U.S. Cl.
CPC ............. *B23Q 7/048* (2013.01); *B21D 43/05* (2013.01); *B21D 43/18* (2013.01); *B23Q 7/046* (2013.01); *B21D 35/003* (2013.01)

(58) Field of Classification Search
CPC ................................ B21D 43/18; B21D 43/05
See application file for complete search history.

(56) References Cited

U.S. PATENT DOCUMENTS

| 5,131,256 | A | * | 7/1992 | Sofy | ................... | B21D 43/057 72/405.13 |
| 2007/0277582 | A1 | * | 12/2007 | Dangelmayr | ........ | B21D 43/057 72/405.09 |
| 2011/0107924 | A1 | * | 5/2011 | Zeibig | .................. | B21D 43/057 100/102 |

FOREIGN PATENT DOCUMENTS

| JP | 02298487 A | * | 12/1990 |
| JP | 2006-346699 A | | 12/2006 |

(Continued)

OTHER PUBLICATIONS

International Search Report of PCT/JP2014/001515 dated Apr. 22, 2014 and translation thereof.

*Primary Examiner* — Gerald McClain
(74) *Attorney, Agent, or Firm* — Muncy, Geissler, Olds & Lowe, P.C.

(57) ABSTRACT

A workpiece conveying apparatus capable of simultaneously conveying two workpieces includes a body section, a right arm and a left arm, the right arm and the left arm being attached to the body section, the right arm and the left arm being horizontally rotatable, a crossbar connected to the right arm, a first suction device attached to the crossbar, a shifter including an attaching section attached to the crossbar and a driving section configured to move with respect to the attaching section, and a second suction device attached to the driving section. The driving section is pivotally (Continued)

attached to a connector bar attached to the left arm, and the driving section is configured to move with respect to the crossbar on the basis of rotation of the right arm and the left arm.

4 Claims, 6 Drawing Sheets

(51) Int. Cl.
*B21D 43/05* (2006.01)
*B21D 35/00* (2006.01)

(56) References Cited

FOREIGN PATENT DOCUMENTS

| JP | 2007-216254 | A |   | 8/2007 |            |
|----|-------------|---|---|--------|------------|
| JP | 2007216254  | A | * | 8/2007 |            |
| JP | 2009-208080 | A |   | 9/2009 |            |
| JP | 2009208080  | A | * | 9/2009 |            |
| JP | 2013006185  | A | * | 1/2013 | B21D 43/052 |

\* cited by examiner

FIG.4B(a)
FIG.4B(b)
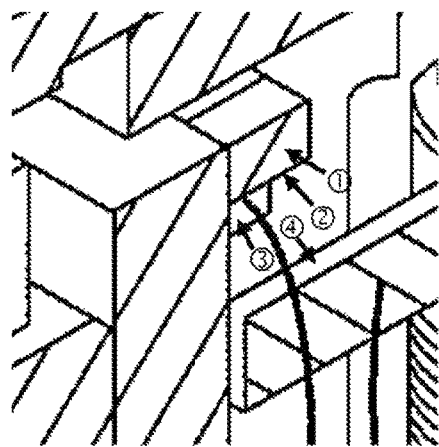
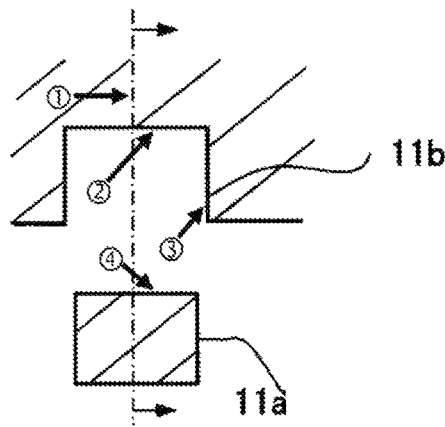
① Cross section
② Upper surface of groove
③ Sidewall of groove
④ Top surface of claw portion

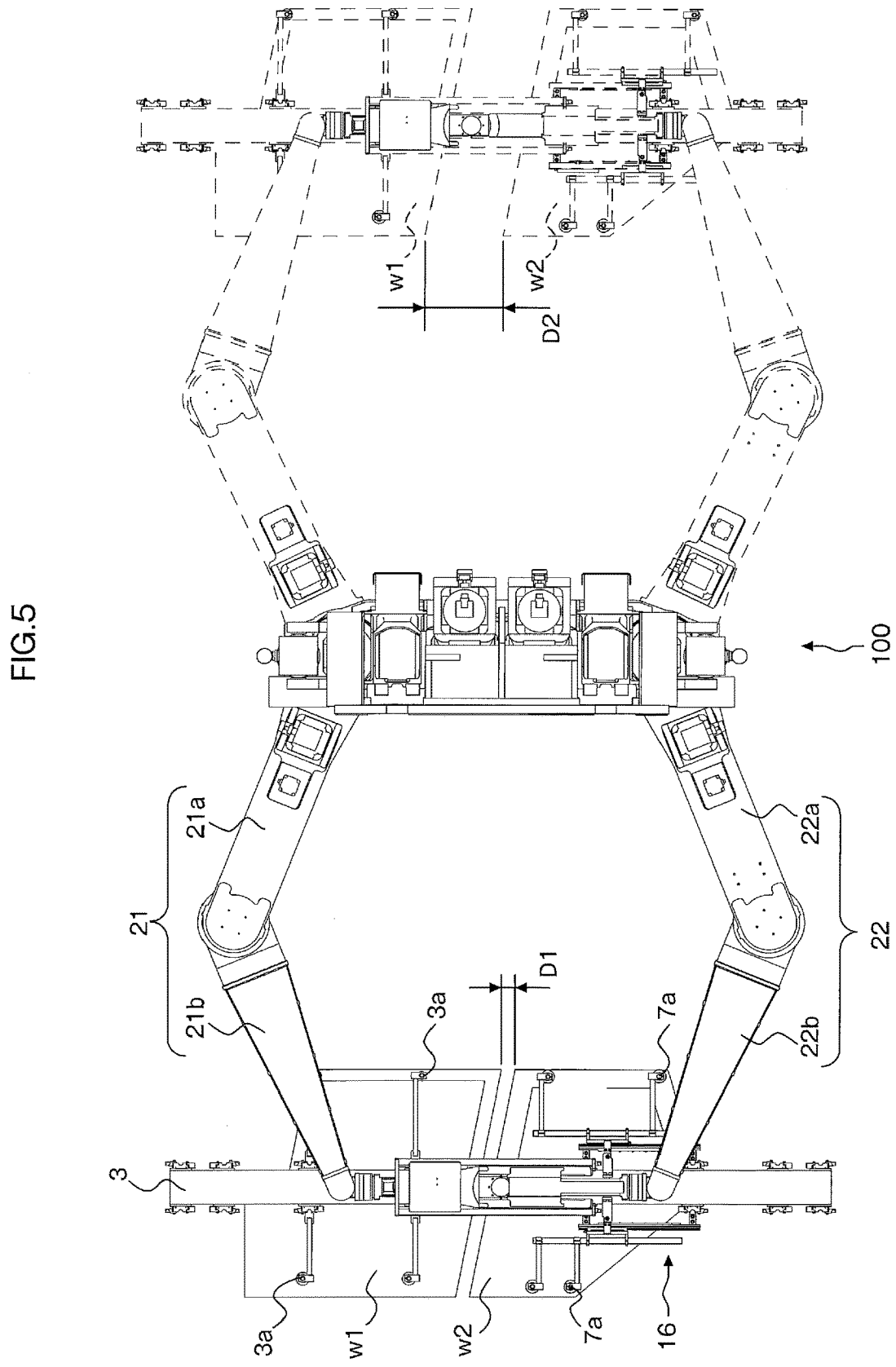

WORKPIECE TRANSFER APPARATUS WITH SHIFTER AND CROSSBAR AND WORKPIECE TRANSFER METHOD USING SAME

TECHNICAL FIELD

The present invention relates to workpiece conveying apparatuses and methods for conveying workpieces by using the same. More particularly, the present invention relates to a workpiece conveying apparatus capable of simultaneously conveying two workpieces from one pressing machine to another while varying the distance between the workpieces and a method for conveying workpieces by using the same.

BACKGROUND ART

In press working, a workpiece conveying apparatus is used for carrying continuously conveyed workpieces into or out of a pressing machine.

A known example of such a workpiece conveying apparatus is a workpiece conveying apparatus including: a pair of arm units; a workpiece gripping mechanism mounted between the respective distal ends of the arm units, and an elevating unit configured to move up and down the arm units, wherein a workpiece held by the workpiece gripping mechanism is conveyed by operating the arm units and the elevating unit (e.g. see PTL 1).

Another known example of such a workpiece conveying apparatus is a workpiece conveying apparatus including: a pair of arm units; a workpiece gripping mechanism mounted between the respective distal ends of the arm units; and an elevating mechanism for moving up and down the arm units with respect to a base substrate, wherein each of the arm units has a movable arm with which the respective distal ends of the arm units are joined so as to be movable with respect to each other and the workpiece gripping mechanism is supported via the movable arms (e.g. see PTL 2).

Recently, in press working, simultaneous conveyance and pressing of two workpieces has been performed with a view to improving productivity and streamlining.

A known example of such a workpiece conveying apparatus is a workpiece conveying apparatus including: a first movable arm having a first workpiece gripping mechanism; and a second movable arm having a second workpiece gripping mechanism, wherein the first movable arm and the second movable arm are joined so as to be movable with respect to each other (e.g. see PTL 3).

CITATION LIST

Patent Literature

PTL 1: Japanese Patent Application Laid-Open No. 2006-346699
PTL 2: Japanese Patent Application Laid-Open No. 2007-216254
PTL 3: Japanese Patent Application Laid-Open No. 2009-208080

SUMMARY OF INVENTION

Technical Problem

Incidentally, there has been a demand for a workpiece conveying apparatus which, for example in a case where two workpieces of different sizes are continuously and simultaneously pressed by a plurality of pressing machines or in a case where two workpieces are continuously and simultaneously pressed by a plurality of pressing machines into different shapes, can convey the two workpieces while varying the distance between the workpieces according to the shape of a die or the like. That is, there has been a demand for a workpiece conveying apparatus capable of making the distance between the two workpieces in the upstream pressing machine and the distance between the two workpieces in the downstream pressing machine different from each other.

However, none of the workpiece conveying apparatuses disclosed in PTLs 1 to 3 can simultaneously convey two workpieces while varying the distance between the workpieces by actively moving the pair of arm units.

An attempt to vary the distance between the workpieces by moving the arm units in any of the workpiece conveying apparatuses disclosed in PTLs 1 to 3 requires a special apparatus for moving the arm units and an extra driving device such as an air cylinder. In this case, the workpiece conveying apparatus undesirably becomes complex and also larger in weight load.

The present invention has been made in view of these circumstances, and it is an object of the present invention to provide a workpiece conveying apparatus that is simple in structure and yet capable of simultaneously conveying two workpieces while varying the distance between the workpieces.

Solution to Problems

The inventor of the present invention diligently studied in order to solve the problems described above. As a result, the inventor found that the problems can be solved by attaching a shifter including a driving section to a crossbar and moving the driving section of the shifter with respect to the crossbar on the basis of rotation of a right arm and a left arm. Thus, the inventor finally accomplished the present invention.

A first aspect of the present invention is directed to a workpiece conveying apparatus capable of simultaneously conveying two workpieces, the workpiece conveying apparatus including: a body section; a right arm and a left arm being attached to the body section and being horizontally rotatable; a crossbar connected to the right arm; first suction means attached to the crossbar; a shifter attached to the crossbar; and second suction means attached to the shifter, wherein the shifter includes an attaching section and a driving section configured to move with respect to the attaching section, the driving section is pivotally attached to a connector bar attached to the left arm, and the driving section is configured to move with respect to the crossbar on a basis of rotation of the right arm and the left arm.

A second aspect of the present invention is directed to the workpiece conveying apparatus according to the first aspect, wherein the shifter is attachable to and detachable from the crossbar.

A third aspect of the present invention is directed to the workpiece conveying apparatus according to the first or second aspect, wherein the crossbar has a plurality of holders on both sides thereof, and the first suction means and the attaching section of the shifter are attached to the holders.

A fourth aspect of the present invention is directed to the workpiece conveying apparatus according to the third aspect, wherein the attaching section includes a pair of front and rear guide rails, the driving section includes a base configured to move along the guide rails and auxiliary crossbars attached to the bases, the guide rails are attached to the holders, and the second suction means are attached to the auxiliary crossbars.

A fifth aspect of the present invention is directed to the workpiece conveying apparatus according to the fourth aspect, wherein the driving section is provided with a lock mechanism for fixing the bases to the guide rails.

A sixth aspect of the present invention is directed to the workpiece conveying apparatus according to any one of the first to fifth aspects, wherein the workpiece conveying apparatus is attached to a pressing machine for use.

A seventh aspect of the present invention is directed to a method for conveying workpieces by using a workpiece conveying apparatus according to any one of the first to sixth aspects, the method including: gripping one of the workpieces by the first suction means; gripping the other of the workpieces by the second suction means; and varying a distance between the workpieces by moving the driving section of the shifter while simultaneously conveying the workpieces.

Advantageous Effects of Invention

In the workpiece conveying apparatus of the present invention, the shifter is attached to the crossbar, the right arm is connected to the crossbar, and the left arm is pivotally attached to the driving section of the shifter via the connector bar. This makes it possible to move the driving section of the shifter with respect to the crossbar on the basis of rotation of the right arm and the left arm without providing a special device or a driving device. It should be noted that the shifter is a so-called slide mechanism.

Moreover, since the first suction means are attached to the crossbar, one of the workpieces can be sucked, and since the second suction means are attached to the driving section of the shifter, the other of the workpieces can be sucked.

For these reasons, the workpiece conveying apparatus is simple in structure and yet capable of simultaneously conveying two workpieces on the basis of rotation of the right arm and the left arm while varying the distance between the workpieces.

In the workpiece conveying apparatus of the present invention, the shifter is attachable to and detachable from the crossbar. Therefore, in a case where there is no need to vary the distance between the workpieces, the shifter can be detached. Specifically, since the shifter includes the attaching section including the pair of front and rear guide rails attached to the holders, it is only necessary to detach the guide rails from the holders.

In so doing, since the crossbar has a plurality of holders on both sides thereof and the first suction means and the attaching section of the shifter are attached to the holders, it is possible to detach the shifter and attach other suction means to the holders.

In the workpiece conveying apparatus of the present invention, the driving section is provided with a lock mechanism for fixing the bases to the guide rails. Therefore, in a case where the shifter is not used, unintended movement of the driving section can be prevented by fixing the driving section.

The workpiece conveying apparatus of the present invention is attached to a pressing machine for use. As such, the workpiece conveying apparatus of the present invention compactly convey workpieces without requiring a space.

The method for conveying workpieces of the present invention uses the aforementioned workpiece conveying apparatus to grip one of the workpieces by the first suction means, grip the other of the workpieces by the second suction means, and moving the driving section of the shifter while simultaneously conveying the workpieces. This achieves a simple structure and yet makes it possible to simultaneously convey two workpieces while varying the distance between the workpieces.

BRIEF DESCRIPTION OF DRAWINGS

FIG. 4B(*a*) is a partially enlarged view of FIG. 4A, and FIG. 4B(*b*) is a reference view illustrating a groove shown in FIG. 4B(*a*).

FIG. 5 is an explanatory diagram for explaining a method for conveying workpieces according to the present embodiment.

DESCRIPTION OF EMBODIMENTS

Figure 1:
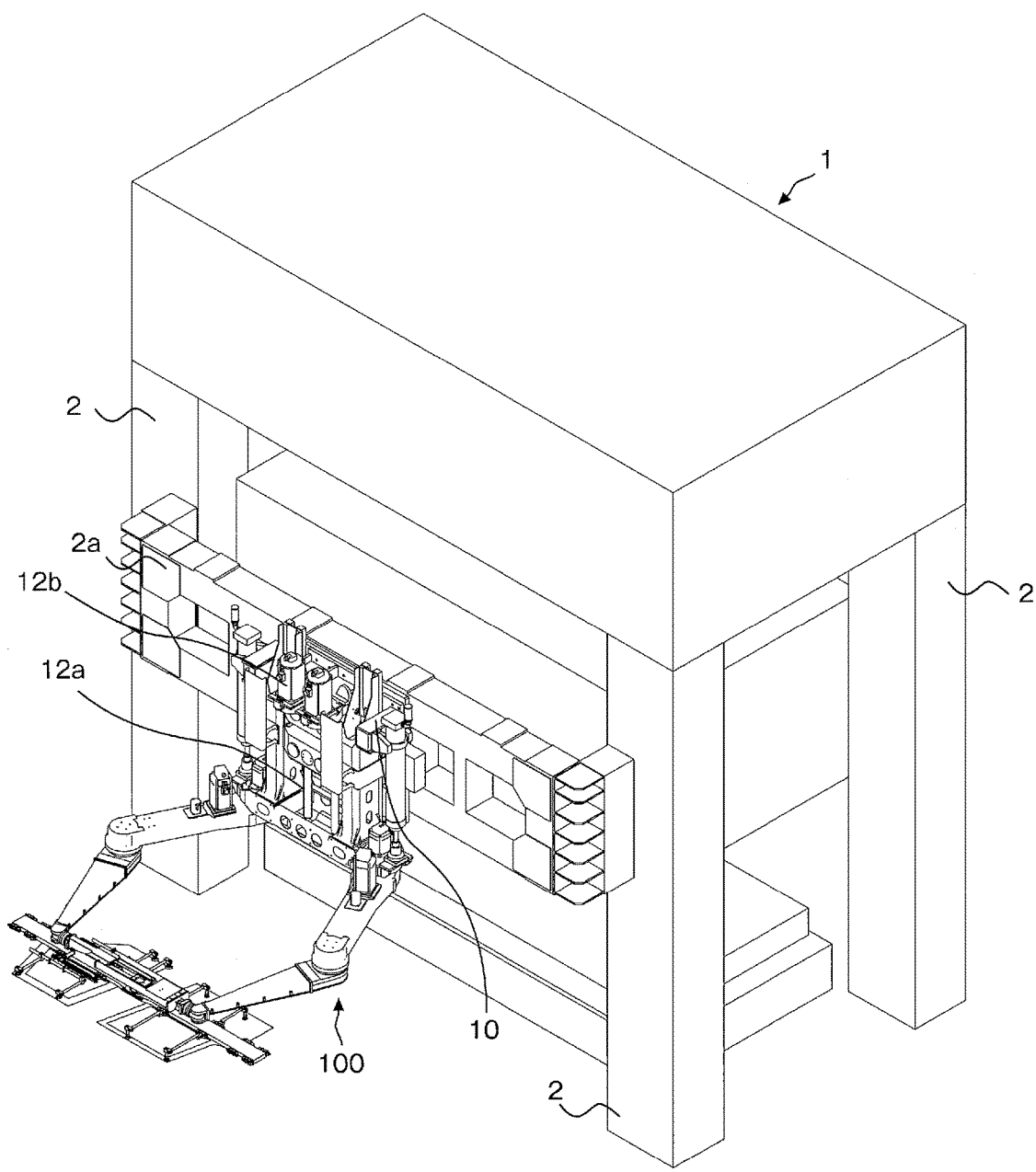
FIG. 1 is a perspective view showing a pressing machine to which a workpiece conveying apparatus according to the present embodiment is attached.

A preferred embodiment of the present invention is described in detail below with reference to the drawings as needed. In the drawings, the same components are given the same reference signs, and repetition of the same descriptions is omitted. Further, unless otherwise noted, positional relationships such as top and bottom, left and right are based on those shown in the drawings. Furthermore, the dimensional ratios of the drawings are not limited to those shown in the drawings.

A workpiece conveying apparatus of the present invention is used as an apparatus for simultaneously conveying two workpieces to a pressing machine. The press may be a tandem press line pressing machine or a transfer press line pressing machine.

FIG. 1 is a perspective view showing a pressing machine to which a workpiece conveying apparatus according to the present embodiment is attached.

As shown in FIG. 1, a pressing machine 1 is supported by four uprights 2, with a fixing bar 2*a* attached so as to bridge a pair of the uprights 2.

Moreover, a workpiece conveying apparatus 100 has a body section 10 attached to substantially the center of the fixing bar 2*a*. That is, the workpiece conveying apparatus 100 is fixed to aside face of the pressing machine 1 via the fixing bar 2*a*.

The body section 10 has ball screws 12*a* and motors 12*b* attached on both side thereof. The motors 12*b* are configured to drive the ball screws 12*a*.

Further, the ball screws 12*a* and the motors 12*b* enable the workpiece conveying apparatus 100 to move upward and downward with respect to the fixing bar 2*a* via the body section 10. This allows the workpiece conveying apparatus to move up and down so as to be in an optimum position for the shape of a die, the shape of a workpiece, or the like.

The workpiece conveying apparatus 100 is configured to simultaneously told two workpieces by suction and carry the workpieces into the pressing machine 1. In a case where another pressing machine is attached to an upstream side of the workpiece conveying apparatus 100, the workpiece conveying apparatus 100 is configured to hold by suction workpieces processed by the upstream pressing machine, carry the workpieces out of the upstream pressing machine, carry the workpieces into the pressing machine 1.

In this way, the workpiece conveying apparatus 100 can be directly attached to the pressing machine 1. As such, the workpiece conveying apparatus 100 can compactly convey workpieces (carry workpieces out and carry workpieces in) without requiring a space.

Figure 2:
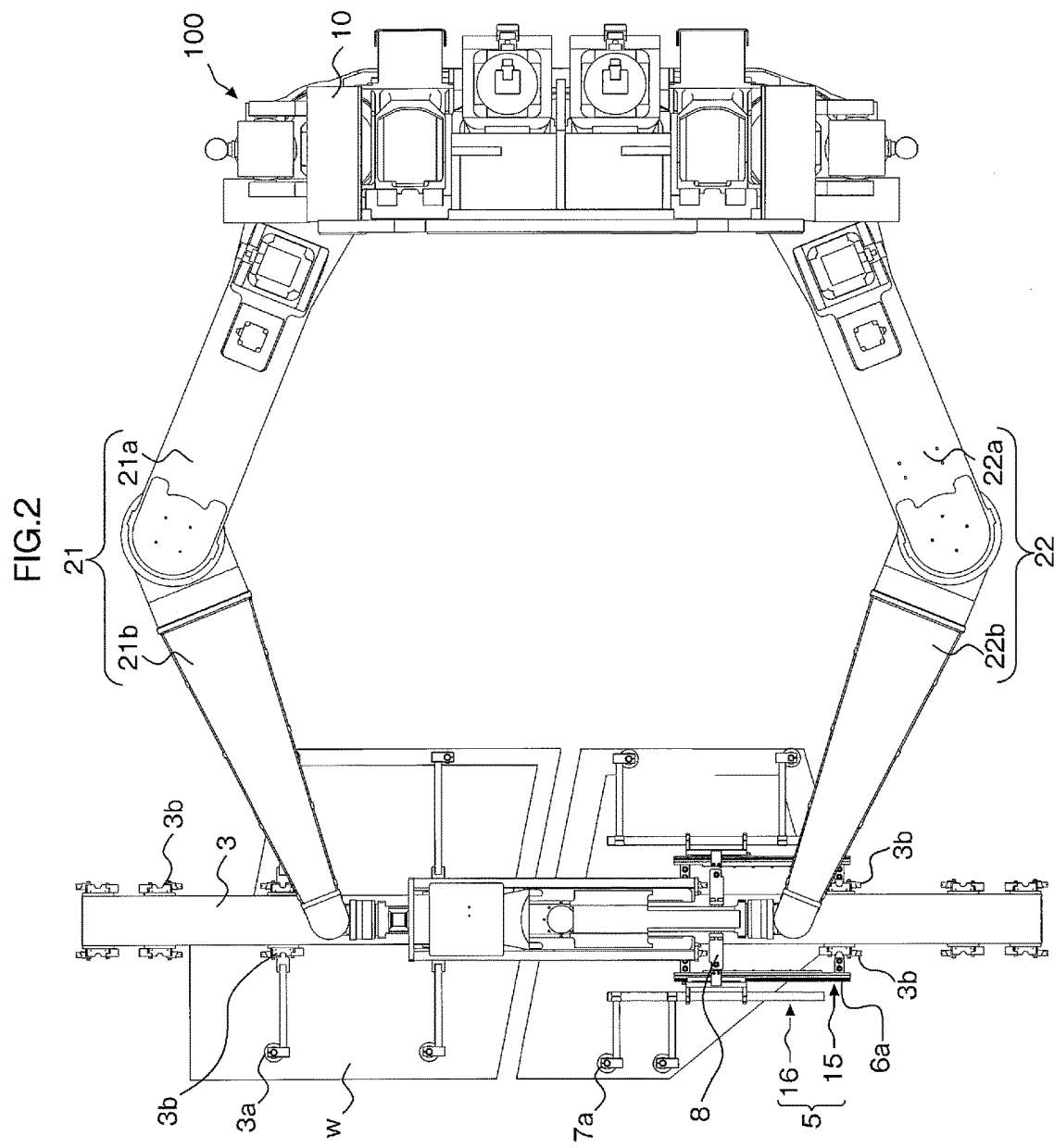
FIG. 2 is a top view showing the workpiece conveying apparatus according to the present embodiment.

FIG. 2 is a top view showing the workpiece conveying apparatus according to the present embodiment.

As shown in FIG. 2, the workpiece conveying apparatus 100 includes the body section 10, which is fixed to a pressing machine; a right arm 21 and a left arm 22 attached to the body section 10; a crossbar 3 connected to the right arm 21; first suction means 3a attached to the crossbar 3; a shifter 5 attached to the crossbar 3; and second suction means 7a attached to a driving section 16 of the shifter 5.

Further, the shifter 5 includes an attaching section 15 and the driving section 16, which is configured to move with respect to the attaching section 15.

The right arm 21 and the left arm 22 are rotatably attached to the body section 10, and the right arm 21 and the left arm 22 are symmetrically structured.

The right arm 21 includes an upper right arm section 21a pivotally attached to the body section 10 and a lower right arm section 21b pivotally attached to the upper right arm section 21a. The right arm 21 is horizontally rotatable on a part of the body section 10 as an axis.

Similarly, the left arm 22 includes an upper left arm section 22a pivotally attached to the body section 10 and a lower left arm section 22b pivotally attached to the upper left arm section 22a. The left arm 22 is horizontally rotatable on a part of the body section 10 as an axis.

Moreover, the crossbar 3 is pivotally attached to a distal end of the lower right section 21b, and the driving section 16 of the shifter 5 is attached to a distal end of the lower left arm section 22b via a connector bar 8. It should be noted here that the attaching section 15 of the shifter 5 is attached to the crossbar 3 so that the driving section 16 of the shifter 5 can move along a length direction of the crossbar 3. The shifter 5 will be described in detail later.

Therefore, the crossbar 3 is configured to be supported by the right arm 21 and also supported by the left arm 22 via the shifter 5. This makes it possible to dispersedly support the weights of even comparatively heavy workpieces W and carry the workpieces W in at a high speed.

Further, horizontal rotation of the aforementioned right arm 21 and left arm 22 causes the crossbar 3 to move in the direction that the workpieces travel.

The workpiece conveying apparatus 100 includes a plurality of holders 3b provided on both sides of the crossbar 3.

Moreover, the first suction means 3a are attached to the holders 3b on the right arm 21 side of the crossbar 3, and the attaching section 15 of the shifter 5 is attached to the holders 3b on the left arm 22 side of the crossbar 3.

It should be noted here that in the workpiece conveying apparatus 100, the shifter 5 is directly attached to the holders 3b of the crossbar 3. Specifically, the after-mentioned guide rails 6a of the attaching section 15 of the shifter 5 are detachably attached to the holders 3b of the crossbar 3. That is, the shifter 5 can be attached to the holders 3b of a crossbar to which suction means are attached, instead of the suction means. This allows a conventional crossbar to be used without any change.

Therefore, for example, in a case where the shifter 5 is not used in conveying workpieces (i.e. in a case where there is no need to vary the distance between the workpieces), the shifter 5 may be detached and the first suction means 3a for gripping a workpiece may be attached to the holders 3b for use.

Usable examples of the first suction means 3a are publicly known suction pads. In this case, a workpiece is gripped by suction with vacuum suction in the suction pads.

Figure 3:
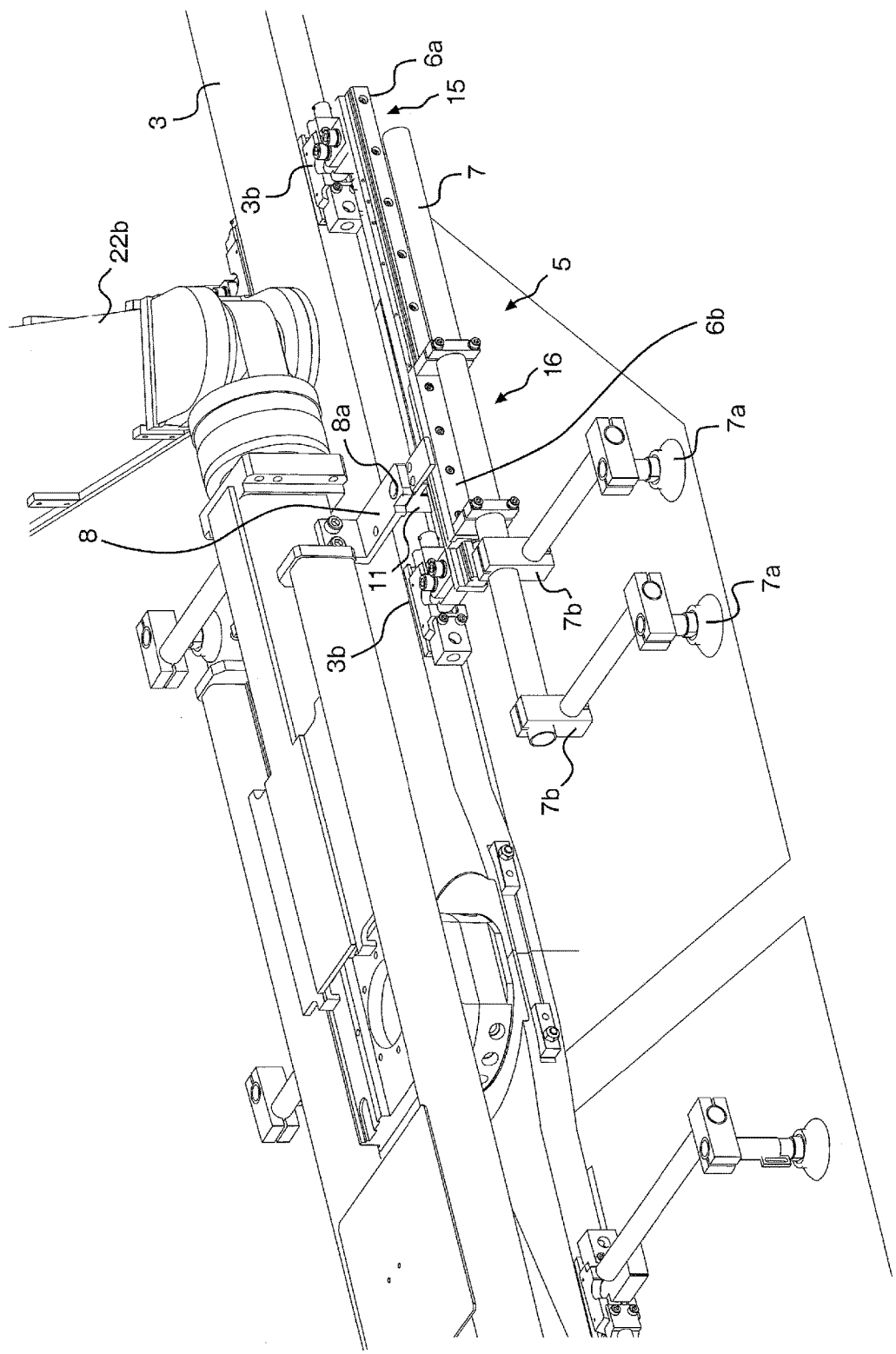
FIG. 3 is a perspective view showing a part of the workpiece conveying apparatus according to the present embodiment.

FIG. 3 is a perspective view showing a part of the workpiece conveying apparatus according to the present embodiment.

As shown in FIG. 3, in the workpiece conveying apparatus 100, the connector bar 8, which extends forward and backward, is fixed to the distal end of the lower left arm section 22b of the left arm 22.

The shifter 5 includes the attaching section 15 and the driving section 16.

The attaching section 15 includes a pair of front and rear guide rails 6a, and the driving section 16 includes bases 6b configured to move along the guide rails 6a, respectively, and auxiliary crossbars 7 attached to the bases 6b, respectively. It should be noted that each of the guide rails 6a is placed parallel to the crossbar 3.

Attached to the bases 6b of the shifter 5 are pins 8a loosely fitted in holes provided in the connector bar 8, respectively.

In the workpiece conveying apparatus 100, horizontal rotation of the left arm 22 causes the connector bar 8 to move in the length direction of the crossbar 3, and as the connector bar 8 moves, the bases 6b to which the auxiliary crossbars 7 are attached move along the guide rails 6a. That is, the driving section 16 of the shifter 5 moves in the length direction of the crossbar 3 with respect to the crossbar 3 on the basis of rotation of the right arm 21 and the left arm 22.

In the shifter 5, each of the auxiliary crossbars 7 is provided with a plurality of auxiliary holders 7b.

Moreover, the second suction means 7a are attached to the auxiliary holders 7b.

It should be noted that as in the case of the first suction means 3a, publicly known suction pads can be used as the second suction means 7a.

In the workpiece conveying apparatus 100 according to the present embodiment, the attaching section 15 of the shifter 5 is attached to the crossbar 3, the right arm 21 is connected to the crossbar 3, and the left arm 22 is attached to the bases 6b of the shifter 5 via the connector bar 8 and the pins 8a. This makes it possible to move the shifter 5 in the length direction of the crossbar 3 with respect to the crossbar 3 on the basis of rotation of the right arm 21 and the left arm 22 without providing a special device or a driving device.

Further, since the first suction means 3a are attached to the crossbar 3, one of the workpieces can be sucked, and since the second suction means 7a are attached to the driving section 16 of the shifter 5, the other of the workpieces can be sucked at the same time.

For these reasons, the workpiece conveying apparatus 100 is simple in structure and yet capable of simultaneously conveying two workpieces on the basis of rotation of the right arm 21 and the left arm 22 while varying the distance between the workpieces.

Figure 4A:
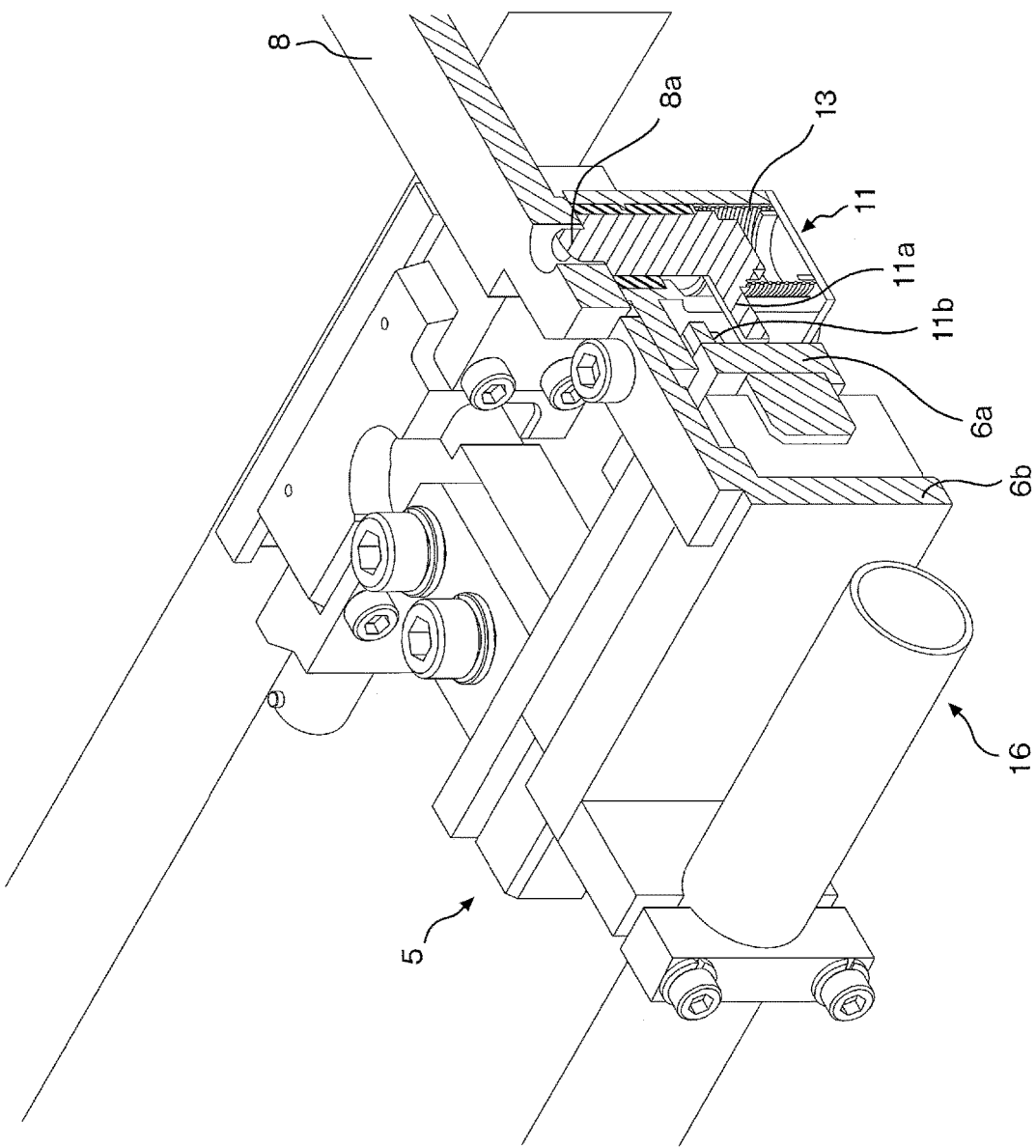
FIG. 4A is a perspective view of a connector bar of the workpiece conveying apparatus according to the present embodiment, with the connector bar cut perpendicularly to a longitudinal direction thereof.

FIG. 4A is a perspective view of the connector bar of the workpiece conveying apparatus according to the present embodiment, with the connector bar cut perpendicularly to a longitudinal direction thereof. FIG. 4B(a) is a partially enlarged view of FIG. 4A, and FIG. 4B(b) is a reference view illustrating a groove shown in FIG. 4B(a).

As shown in FIG. 4A, the driving section 16 of the shifter 5 has a lock mechanism 11 provided in the bases 6b to fix the bases 6b to the guide rails 6a.

Therefore, the lock mechanism 11 is configured to move along the guide rails 6a together with the driving section 16.

Accommodated inside the lock mechanism 11 is the aforementioned pins 8a, on lower surfaces of which springs 13 are provided to bias the pins 8a upward. That is, the pins 8a are in a state of being pressed upward by the springs 13.

Further, the pins 8a have claw portions 11a protruding in a transverse direction.

In the workpiece conveying apparatus 100, the connector bar 8 at the distal end of the lower left arm section 22h is fitted on the pins 8a to press the pins 8a downward. Then, the pins 8a press the springs inside the lock mechanisms 11, and the claw portions move downward accordingly.

Meanwhile, the guide rails 6a of the shifter 5 are provided with grooves 11b so that the claw portions 11a are inserted in the grooves 11b when moved upward. This causes the bases 6b to be fixed to the guide rails 6a to become unable to move along the guide rails 6a.

Therefore in a case where the connector bar 8 of the left arm 22 is fitted on the pins 8a of the shifter 5, the claw portions 11a are detached from the grooves 11b and the bases 6b move along the guide rails 6a, and in a case where the connector bar 8 of the left arm 22 is detached from the pins 8a of the shifter 5, the claw portions 11a are inserted in the grooves 11b and the bases 6b do not move along the guide rails 6a and are fixed.

Thus, in the workpiece conveying apparatus 100, the shifter 5 is provided with the lock mechanism 11 for fixing the bases 6b. Therefore, in a case where the shifter 5 is not used, unintended movement of the bases 6b can be prevented by fixing the bases 6b in the manner described above.

The following describes a method for conveying workpieces by using a workpiece conveying apparatus.

FIG. 5 is an explanatory diagram for explaining a method for conveying work workpieces according to the present embodiment.

As shown in FIG. 5, the method for conveying workpieces includes first gripping a right side workpiece W1 by the first suction means 3a on the right arm 21 side and then gripping a left side workpiece W2 by the second suction means 7a of the left arm 22.

Next, the workpieces W are horizontally conveyed by rotating the upper and lower right arm sections 21a and 21b of the right arm 21 and the upper and lower left arm sections 22a and 22b of the left arm 22.

At this point in time, the driving section 16 of the shifter 5 moves along the length direction of the crossbar 3 extending in a direction perpendicular to the direction that the workpieces W1 and W2 travel. It should be noted that the moving distance that the driving section 16 of the shifter 5 moves is based on how the pair of right and left arms 21 and 22 rotate. The moving of the driving section 16 of the shifter 5 is performed by a set computer program.

Then, the right arm 21 and the left arm 22 are moved to opposite sides, and in predetermined positions, the right side workpiece W1 is released bon/Um first suction means 3a of the right arm 21 and the workpiece W2 is released from the second suction means 7a of the left arm 22.

After that, the right arm 21 and the left arm 22 are returned into their original positions by again rotating the upper and lower right arm sections 21a and 21b of the right arm 21 and the upper and lower left arm sections 22a and 22b of the left arm 22.

In the method for conveying workpieces, the distance D2 between the workpieces W1 and W2 after conveyance is longer than the distance D1 between the workpieces W1 and W2 before conveyance. It should be noted that depending on the set computer program, the distance D2 between the workpieces W1 and W2 after conveyance can be made shorter than the distance D1 between the workpieces W1 and W2 before conveyance.

Thus, the method for conveying workpieces makes it possible to vary the distance between the workpieces W1 and W2 by moving the driving section 16 of the shifter 5 during conveyance. That is, the method for conveying workpieces uses the aforementioned workpiece conveying apparatus to achieve a simple structure and yet make it possible to simultaneously convey two workpieces while varying the distance between the workpieces.

The foregoing has described a preferred embodiment of the present invention. However, the present invention is not limited to the embodiment described above.

For example, instead of a workpiece conveying apparatus 100 according to present embodiment being fixed to a side face of the pressing machine 1, workpiece conveying apparatuses 100 may be attached to both sides of the pressing machine 1, respectively.

In the workpiece conveying apparatus 100 according to the present embodiment, the body section 10 is attached to substantially the center of the fixing bar 2a. Alternatively, the body section 10 may be attached to a position deflected to one side of the fixing bar 2a.

In the workpiece conveying apparatus 100 according to the present embodiment, the crossbar 3 is pivotally attached to the distal end of the lower right arm section 21b, and the shifter 5 is attached to the distal end of the lower left arm section 22b via the connector bar 8. Alternatively, a left-right reversal may be made. That is, a crossbar may be pivotally attached to the distal end of a left arm section, and a shifter may be attached to the distal end of a lower right arm section via a connector bar.

Further, the shifter 5 may be attached to the distal end of the lower left arm section 22b via a clamping device instead of the connector bar 8.

INDUSTRIAL APPLICABILITY

A workpiece conveying apparatus of the present invention is used for example in press working as an apparatus for conveying workpieces to a pressing machine. The workpiece conveying apparatus of the present invention is simple in structure and yet capable of simultaneously conveying two workpieces while varying the distance between the workpieces.

REFERENCE SIGNS LIST

1 . . . pressing machine
2 . . . upright
2a . . . fixing bar
3 . . . crossbar
3a . . . first suction means
3b . . . holder
5 . . . shifter
6a . . . guide rail
6b . . . base
7 . . . auxiliary crossbar 7a . . . second suction means
7b . . . auxiliary holder
8 . . . connector bar
8a . . . pin
10 . . . body section
11 . . . lock mechanism
11a . . . claw portion
11b . . . groove
12a . . . ball screw
12b . . . motor
13 . . . spring
15 . . . attaching section
16 . . . driving section
21 . . . right arm
21a . . . upper right arm section
21b . . . lower right arm section
22 . . . left arm
22a . . . upper left arm section
22b . . . lower left arm section
100 . . . workpiece conveying apparatus
W1, W2 . . . workpiece

The invention claimed is:

1. A workpiece conveying apparatus capable of simultaneously conveying two workpieces, the workpiece conveying apparatus comprising:
a body section;
a right arm and a left arm being attached to the body section and being horizontally rotatable;
a crossbar connected to the right arm;
first suction means attached to the crossbar;
a shifter attached to the crossbar; and
second suction means attached to the shifter,
wherein the shifter includes an attaching section and a driving section configured to move with respect to the attaching section,
the attaching section includes a pair of front and rear guide rails,
the driving section includes a base configured to move along the guide rails and auxiliary crossbars attached to the bases and extending in a length direction of the crossbars,
the driving section is configured to move with respect to the crossbar on a basis of rotation of the right arm and the left arm,
the crossbar has a plurality of holders on both sides thereof,
the first suction means and the front and rear guide rails are attached to the holders,
the second suction means are attached to the auxiliary crossbars,
a connector bar attached to the left arm is pivotally attached to pins provided on the bases,
the driving section is provided with a lock mechanism having claw portions that move as the pins move upward and downward, the claw portions protruding in a transverse direction from the pins,
the guide rails are provided with downward grooves,
in a case where the connector bar is detached from the pins, the claw portions move upward together with the pins and the claw portions are engaged in the grooves so that the bases do not move along the guide rails and are fixed, and
in a case where the connector bar is fitted on the pins, the claw portions move downward together with the pins and the claw portions are detached from the grooves so that the bases are movable along the guide rails.

2. The workpiece conveying apparatus according to claim 1, wherein the shifter is attachable to and detachable from the crossbar.

3. The workpiece conveying apparatus according to claim 1, wherein the workpiece conveying apparatus is attached to a pressing machine for use.

4. A method for conveying workpieces by using a workpiece conveying apparatus according to claim 1, the method comprising:
gripping one of the workpieces by the first suction means;
gripping the other of the workpieces by the second suction means; and
varying a distance between the workpieces by moving the driving section of the shifter while simultaneously conveying the workpieces.

* * * * *